Patented July 23, 1935

2,008,978

UNITED STATES PATENT OFFICE 2,008,978

BITUMINOUS PAVING COMPOSITION

Karl Daimler, Frankfort-on-the-Main-Hochst, Germany, assignor to I. G. Farbenindustrie Aktiengesellschaft, Frankfort - on - the - Main, Germany No Drawing. Application May 13, 1931, Serial No 537,215. In Germany September 12, 1927

14 Claims. (Cl. 106—31)

The present invention relates to a composition of matter for covering roads and to a process of preparing it.

I have found that particularly suitable covering material for roads can be prepared by combining mineral materials with coarsely dispersed bituminous emulsions which have been prepared by coarsely dispersing bituminous substances which are solid to semi-liquid at ordinary temperatures in water while using as emulsifying agents, materials containing humic acid which are insoluble in water. By the term "coarsely dispersing" there is to be understood a dispersing process carried out in such a manner that practically all the dispersed particles of bitumen have a size above $5\mu$. The mineral materials are reduced to small pieces. Thus, for example, broken stones of basalt, basalt chips or sand may be used. This composition may be applied to the road as such, or one may coat the surface of the road first with the bituminous emulsion alone and then apply the mineral material.

Under the term "bitumen" are included both natural and artificial asphalts (the artificial being, for instance, the petroleum product); also tar products, pitches and mixtures of these bodies. Under the term "humic acid" and "materials containing humic acid" are included the following products:

Humic acid obtainable by precipitating by means of acid an alkaline extract from raw material containing humic acid, such as Cassel brown, brown coal, peat or decayed vegetable matter; the said raw materials themselves, generally in the finely subdivided form in which they can be obtained, for example by means of grinding with water; the insoluble salts of humic acids, such as the lime, magnesium, iron or aluminium salts; the sparingly soluble or insoluble labile ammonium salts; products which can be called artificial humic acids, such as, for example, carbonized organic substances in so far as they are soluble in alkali to brown solutions; certain oxidation products of, for instance, tar, hard pitch, nitration products of coal, pitches and the like insofar as these have the characteristic properties of humic acid, namely the brown color and the solubility in alkali.

It is advantageous not to exceed the temperature of 50° C. when preparing the emulsion.

To the emulsions there may likewise be added such substances as are insoluble in water, but subsequently dissolve in the bitumen contained in the emulsion, or as react chemically with the water of the emulsion or with the mineral aggregate in it, or with both.

Additions of this kind are: organic solvents insoluble in water, either as individuals or intermixed, for instance tar of various kinds, tar oil, tar oil fractions, for instance solvent naphtha, heavy benzole or the like; also aliphatic solvents, such as petroleum or the various fractions thereof; gas oil, solar oil; also gum solutions, resin solutions or the like. The solvent or solution is added to the emulsion either shortly before the latter is mixed with the mineral constituents or simultaneously with or shortly after this mixing. It is a surprising fact that during this operation the added substance neither destroys the emulsion, that is, causes the bitumen to precipitate, nor diminishes the capacity of the emulsions for being mixed with the mineral materials. The additions become gradually dissolved in the bitumen after the covering has been finished; a softening if the bitumen, an increase in its elasticity and a more rapid cementing together of the ingredients of the mass are thus obtained. Far the greater part of the easily volatile organic solvents gradually evaporates together with the water, but the heavy or non-volatile constituents, such as anthracene oil, tar pitch, gum, resin or the like remain. The final portions of the volatile solvents naturally evaporate only in the course of time.

Cold asphalts other than those characterized in my co-pending applications cannot be used with the same effect because the bitumen is prematurely precipitated and no coatings of a sufficient solidity and improved properties are produced. By the addition of solvents according to this invention it is possible even during the bad season to make very strong surfaces with an emulsified bitumen of a high melting point.

An analogous effect, namely an acceleration of the setting, is obtained by adding substances adapted to set, such as gypsum, hydraulic silicates, cement and the like. If, for instance, a freshly prepared paste of plaster of the usual concentration is added to the coatings, there is obtained a uniform, grey, well-flowing mass which is completely free from any lumps and can be used with particular advantage for the preparation of coverings. If the coating is mixed with a hydraulic silicate powder, there is obtained a uniform, thinly liquid mass which is free from any lumps and can be used in an excellent manner for the preparation of concrete-like coatings.

Any organic solvent or setting agent may also simultaneously be added to the finished coating.

By this addition the effect is increased. The coverings prepared according to this process can successfully be applied to form coatings even in very unfavorable weather, particularly in the cold season.

The following examples serve to illustrate my invention, but they are not intended to limit it thereto, the parts being by weight:

1. 100 parts of brown coal, rich in humic acid, are very finely ground with 50 parts of water and there are then slowly run in, while stirring, by means of a stirrer making 40-100 revolutions per minute, at 25° C.-30° C., 500 parts of Mexican bitumen (which softens at 20° C.-30° C. by the Krämer-Sarnow test) having a temperature of about 70° C. and 350 parts of water. The mixture is applied by means of a watering-cart having wide perforations to the cleaned road and covered with stone materials, such, for instance, as sand or basalt chips. Preferably these operations are repeated after a short time.

2. 100 parts of brown coal rich in humic acid, 30 parts of slaked lime and 130 parts of water are ground together very finely and there are then slowly run in, while stirring, 500 parts of a mixture having a temperature of about 80° C.-90° C., of 150 parts of prepared tar and 350 parts of Mexican bitumen. To this mixture 250 parts of water are added, while taking care that the temperature of the mass does not exceed 24° C. This mixture is further mixed with 4000 parts of basalt road metal, 3000 parts of basalt chips and 2000 parts of sand. The whole is then rolled on the road surface and covered with sand. Thus, a very solid and durable road covering is obtained.

The bituminous emulsions may also be mixed with cement and the stone materials referred to in Example 1. In this case an elastic, watertight concrete is obtained which may advantageously be used for covering roads and other similar purposes.

This application contains subject matter in common with my applications Serial Nos. 303,954 and 413,687 filed on September 4, 1928 and December 12, 1929.

In the following claims the term "substances of humic acid character" is to be understood to comprise also substances containing water-insoluble salts of the humic acid.

I claim:

1. The process of preparing covering materials for roads which comprises combining mineral materials with bituminous emulsions prepared by dispersing bituminous substances which are solid to semi-liquid at ordinary temperatures in water while using water-insoluble substances of the group consisting of humic acid, the water-insoluble salts thereof, the artificial humic acids, the brown, alkali-soluble oxidation products of tar and hard pitch and the brown, alkali-soluble nitration products of coal as emulsifying agents.

2. The process of preparing covering materials for roads which comprises combining mineral materials with bituminous emulsions prepared by dispersing bituminous substances which are solid to semi-liquid at ordinary temperatures in water while using water-insoluble substances of the group consisting of humic acid, the water-insoluble salts thereof, the artificial humic acids, the brown, alkali-soluble oxidation products of tar and hard pitch and the brown, alkali-soluble nitration products of coal as emulsifying agents with the addition of tar-oil.

3. The process of preparing covering materials for roads which comprises combining mineral materials with bituminous emulsions prepared by dispersing bituminous substances which are solid to semi-liquid at ordinary temperatures in water while using water-insoluble substances of the group consisting of humic acid, the water-insoluble salts thereof, the artificial humic acids, the brown, alkali-soluble oxidation products of tar and hard pitch and the brown, alkali-soluble nitration products of coal as emulsifying agents with the addition of a hydraulic setting substance.

4. The process of preparing covering materials for roads which comprises combining mineral materials with bituminous emulsions prepared by dispersing bituminous substances which are solid to semi-liquid at ordinary temperatures in water while using water-insoluble substances of the group consisting of humic acid, the water-insoluble salts thereof, the artificial humic acids, the brown, alkali-soluble oxidation products of tar and hard pitch and the brown, alkali-soluble nitration products of coal as emulsifying agents with the addition of hydraulic cement.

5. The process of preparing covering materials for roads which comprises combining mineral materials with bituminous emulsions prepared by dispersing bituminous substances which are solid to semi-liquid at ordinary temperatures in water while using water-insoluble substances of the group consisting of humic acid, the water-insoluble salts thereof, the artificial humic acids, the brown, alkali-soluble oxidation products of tar and hard pitch and the brown, alkali-soluble nitration products of coal as emulsifying agents with the addition of tar-oil and hydraulic cement.

6. The process of preparing covering materials for roads which comprises combining basalt chips with bituminous emulsions prepared by dispersing bituminous substances which are solid to semi-liquid at ordinary temperatures in water while using brown coal as emulsifying agent with the addition of tar-oil and hydraulic cement.

7. A new composition of matter comprising a bituminous emulsion containing a substance of the group consisting of humic acid, the water-insoluble salts thereof, the artificial humic acids, the brown, alkali-soluble oxidation products of tar and hard pitch and the brown, alkali-soluble nitration products of coal and mineral material.

8. A new composition of matter comprising a bituminous emulsion containing a substance of the group consisting of humic acid, the water-insoluble salts thereof, the artificial humic acids, the brown, alkali-soluble oxidation products of tar and hard pitch and the brown, alkali-soluble nitration products of coal, mineral material and tar-oil.

9. A new composition of matter comprising a bituminous emulsion containing a substance of the group consisting of humic acid, the water-insoluble salts thereof, the artificial humic acids, the brown, alkali-soluble oxidation products of tar and hard pitch and the brown, alkali-soluble nitration products of coal, mineral material and a hydraulic setting substance.

10. A new composition of matter comprising a bituminous emulsion containing a substance of the group consisting of humic acid, the water-insoluble salts thereof, the artificial humic acids, the brown, alkali-soluble oxidation products of tar and hard pitch and the brown, alkali-soluble nitration products of coal, mineral material and hydraulic cement.

11. A new composition of matter comprising a bituminous emulsion containing a substance of the group consisting of humic acid, the water-insoluble salts thereof, the artificial humic acids, the brown, alkali-soluble oxidation products of tar and hard pitch and the brown, alkali-soluble nitration products of coal, mineral material, tar-oil and hydraulic cement.

12. A new composition of matter comprising a bituminous emulsion containing brown coal, basalt chips, tar-oil and hydraulic cement.

13. The process of preparing covering materials for roads which comprises combining basalt chips with bituminous emulsions prepared by dispersing bituminous substances which are solid to semi-liquid at ordinary temperature in water while using humic acid as emulsifying agent with the addition of tar-oil and hydraulic cement.

14. A new composition of matter comprising a bituminous emulsion containing humic acid, basalt chips, tar-oil and hydraulic cement.

KARL DAIMLER.